(12) United States Patent
Benson

(10) Patent No.: US 11,252,948 B2
(45) Date of Patent: *Feb. 22, 2022

(54) FISHING REEL TECHNOLOGY

(71) Applicant: Bryan Benson, Chappells, SC (US)

(72) Inventor: Bryan Benson, Chappells, SC (US)

(*) Notice: Subject to any disclaimer, the term of this patent is extended or adjusted under 35 U.S.C. 154(b) by 37 days.

This patent is subject to a terminal disclaimer.

(21) Appl. No.: 16/745,000

(22) Filed: Jan. 16, 2020

(65) Prior Publication Data

US 2020/0221677 A1 Jul. 16, 2020

Related U.S. Application Data

(60) Provisional application No. 62/793,066, filed on Jan. 16, 2019.

(51) Int. Cl.
*A01K 89/01* (2006.01)

(52) U.S. Cl.
CPC .................. *A01K 89/0105* (2013.01)

(58) Field of Classification Search
CPC ............ A01K 89/0184; A01K 89/0186; A01K 89/0188; A01K 89/01902; A01K 89/006
See application file for complete search history.

(56) References Cited

U.S. PATENT DOCUMENTS

| | | | | |
|---|---|---|---|---|
| 2,517,776 A * | 8/1950 | Feierabend | .......... | A01K 89/016 242/255 |
| 4,598,878 A * | 7/1986 | Steffan | ................ | A01K 89/017 242/249 |
| 4,867,392 A * | 9/1989 | Sato | ..................... | A01K 89/033 242/255 |
| 5,297,756 A * | 3/1994 | Ikuta | ................. | A01K 89/0184 242/270 |
| 5,690,287 A * | 11/1997 | Ono | ................... | A01K 89/0184 242/255 |
| 7,278,599 B2 * | 10/2007 | Alajajyan | ............ | A01K 89/033 242/291 |
| 8,517,298 B1 | 8/2013 | Benson | | |
| 9,307,749 B1 * | 4/2016 | Alajajyan | .......... | A01K 89/0105 |

* cited by examiner

*Primary Examiner* — Emmanuel M Marcelo
(74) *Attorney, Agent, or Firm* — Skinner and Associates; Joel D. Skinner, Jr.

(57) ABSTRACT

A fishing reel having easily selectable gears is disclosed. A gear assembly is disposed on the side of the reel opposite the crank handle, which has a gear ratio selector knob to easily and quickly change gear ratios to thereby change retrieval speeds.

12 Claims, 23 Drawing Sheets

FISHING REEL TECHNOLOGY

CROSS-REFERENCE TO RELATED APPLICATIONS, IF ANY

This application claims the benefit under 35 U.S.C. § 119(e) of U.S. Provisional Patent Application Ser. No. 62/793,066, filed Jan. 16, 2019, which is hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND

1. Field of the Invention

The present invention relates, generally, to fishing systems, apparatus and methods. Particularly, the invention relates to a fishing reel for use by sport fisherpersons.

2. Background Information

Existing technology in this field is believed to have significant limitations and shortcomings. One problem is that it is difficult to change retrieval speeds. Many fisher persons must carry several reels to alter retrieval speeds. This takes time, is difficult and is expensive. For this and other reasons, a need exists for the present invention.

U.S. Pat. No. 8,517,298, owned by applicant, discloses a convenient way of changing retrieval speeds by changing gear ratios. However, the reel requires manual manipulation of gears and the reel housing. Applicant's present invention is an advance over the technology of his prior patent.

All US patents and patent applications, and all other published documents mentioned anywhere in this application are incorporated by reference in their entirety.

BRIEF SUMMARY OF THE INVENTION

The invention provides an apparatus and method of using the apparatus which are practical, reliable, accurate and efficient, and which are believed to fulfill the need and to constitute an improvement over the background technology.

The invention provides a fishing reel with a gear assembly disposed on the side of the reel opposite the crank handle which has a gear ratio selector knob to easily and quickly change gear ratios to thereby change retrieval speeds. The user need not remove the handle, nor any part of the housing.

In one aspect, the invention provides a reel comprising, a spool, a handle disposed on one side of the spool, and a gear assembly disposed on the opposite side of the spool, the gear assembly being communicatively connected to the handle and to the spool, the gear assembly having at least two gears and a selector for changing the ratio of the gears.

The aspects, features, advantages, benefits and objects of the invention will become clear to those skilled in the art by reference to the following description, claims and drawings.

BRIEF DESCRIPTION OF THE SEVERAL VIEWS OF THE DRAWING

The present invention, and the manner and process of making and using it, will be better understood by those skilled in the art by reference to the following drawings.

FIG. 4A is a cross-sectional view of the device taken at line 4A-4A of FIG. 4.

DETAILED DESCRIPTION

Figure 1:
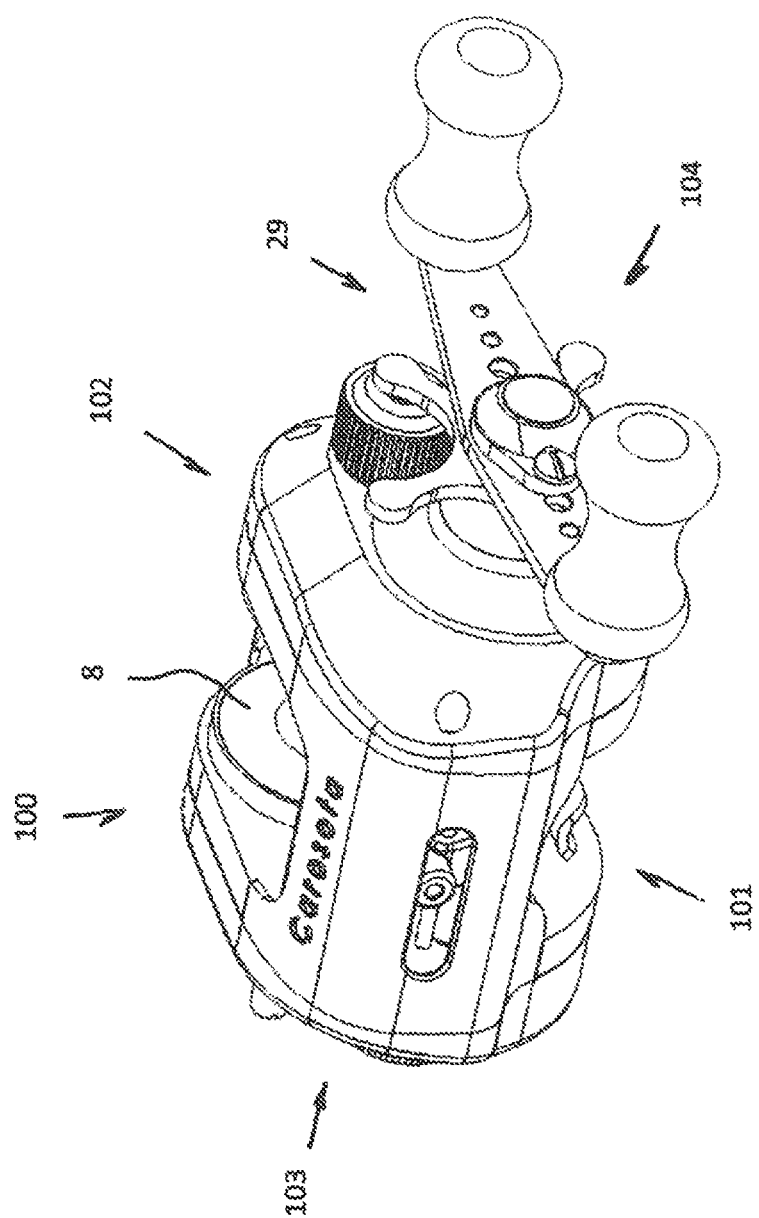
FIG. 1 is a perspective view of an embodiment of a device of the invention.
Figure 2:
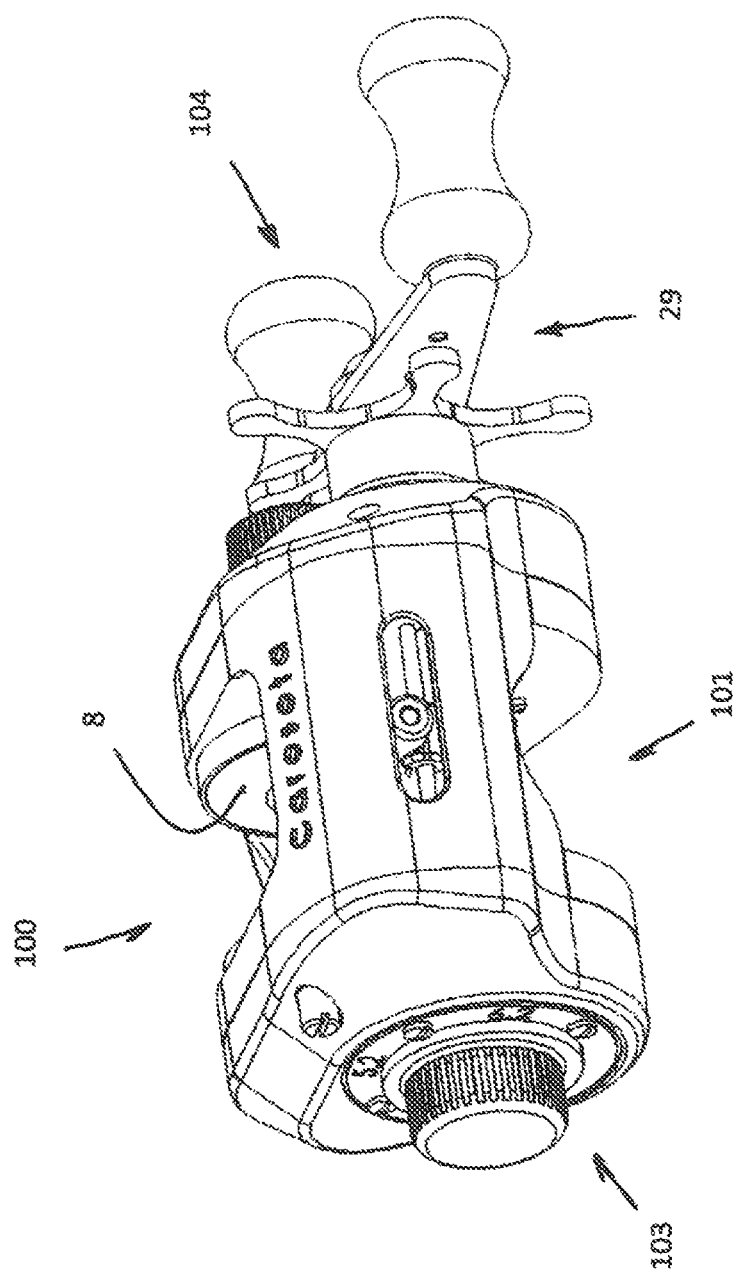
FIG. 2 is a second perspective view of the device.
Figure 3:
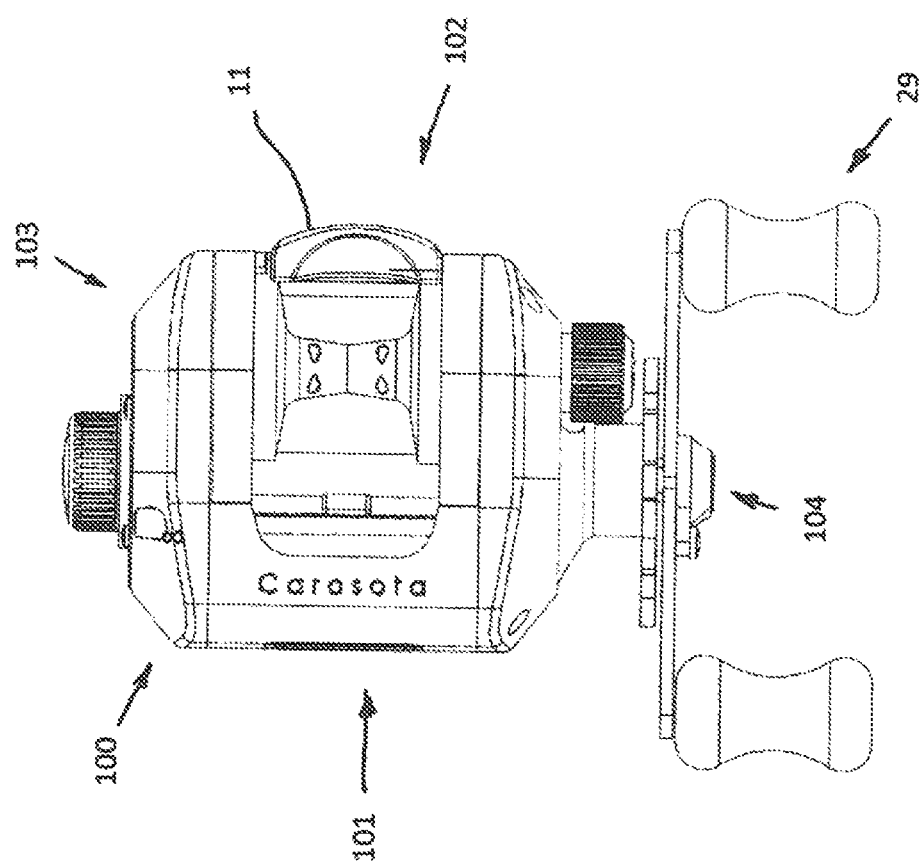
FIG. 3 is a top, plan view of the device.
Figure 4:
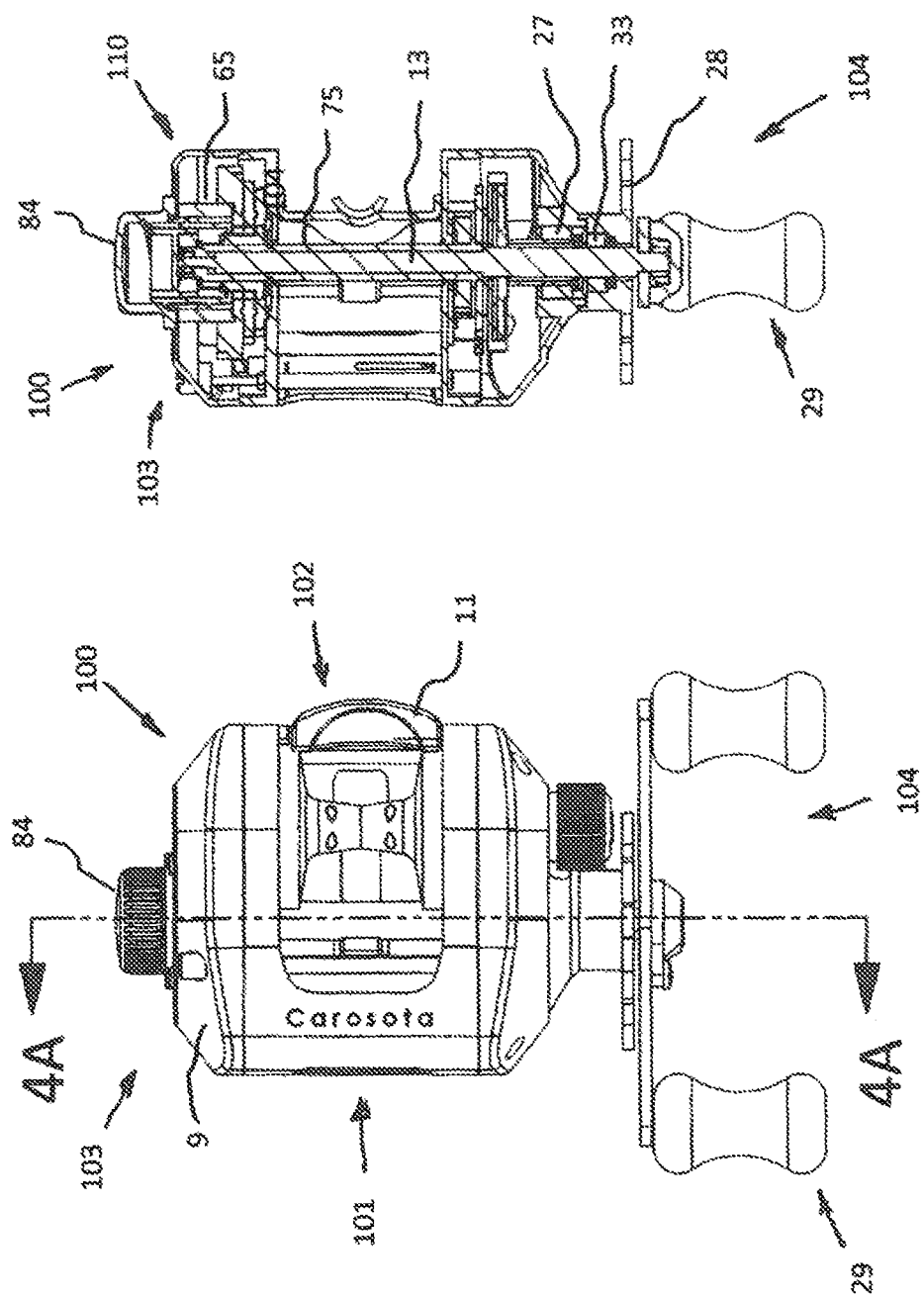
FIG. 4 is an additional top, plan view of the device.
Figure 5:
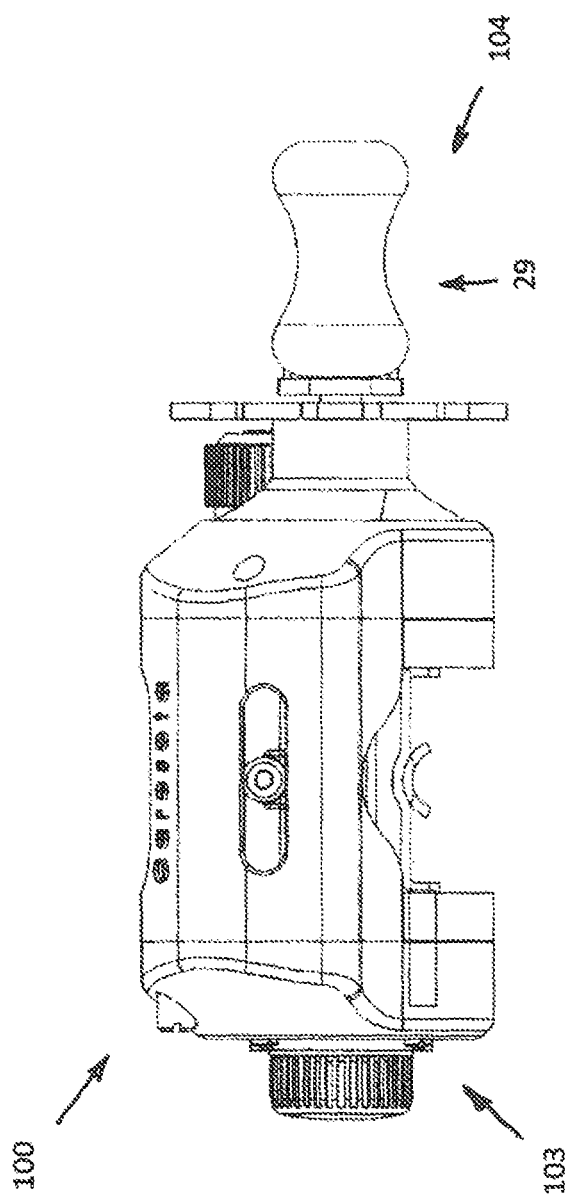
FIG. 5 is a front, elevation view of the device.
Figure 6:
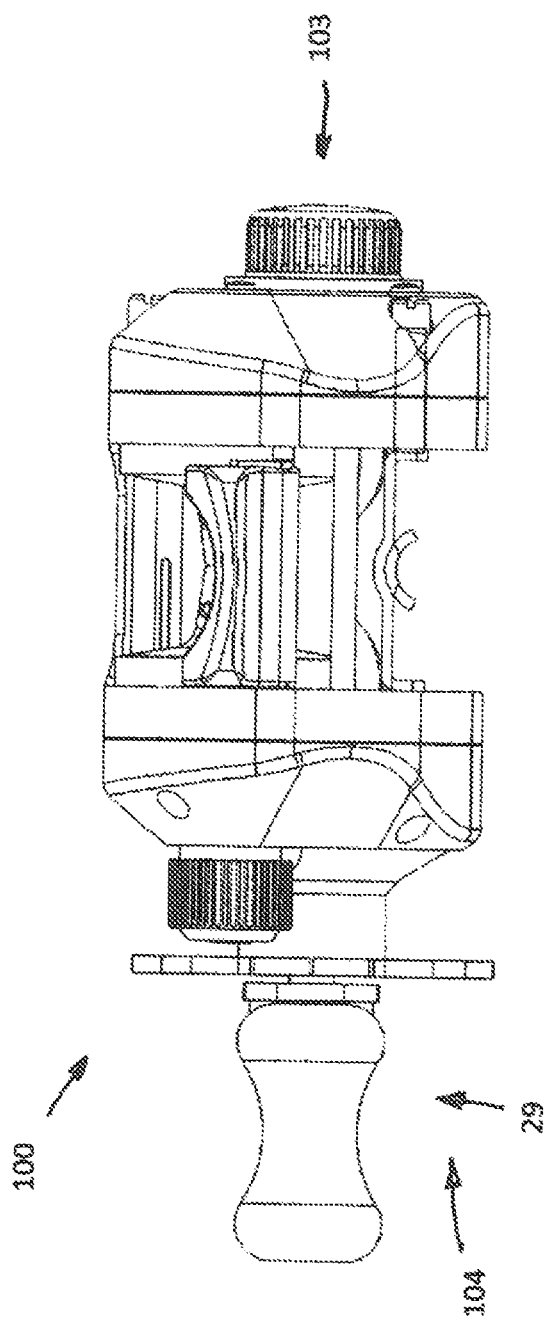
FIG. 6 is a back view of the device.
Figure 7:
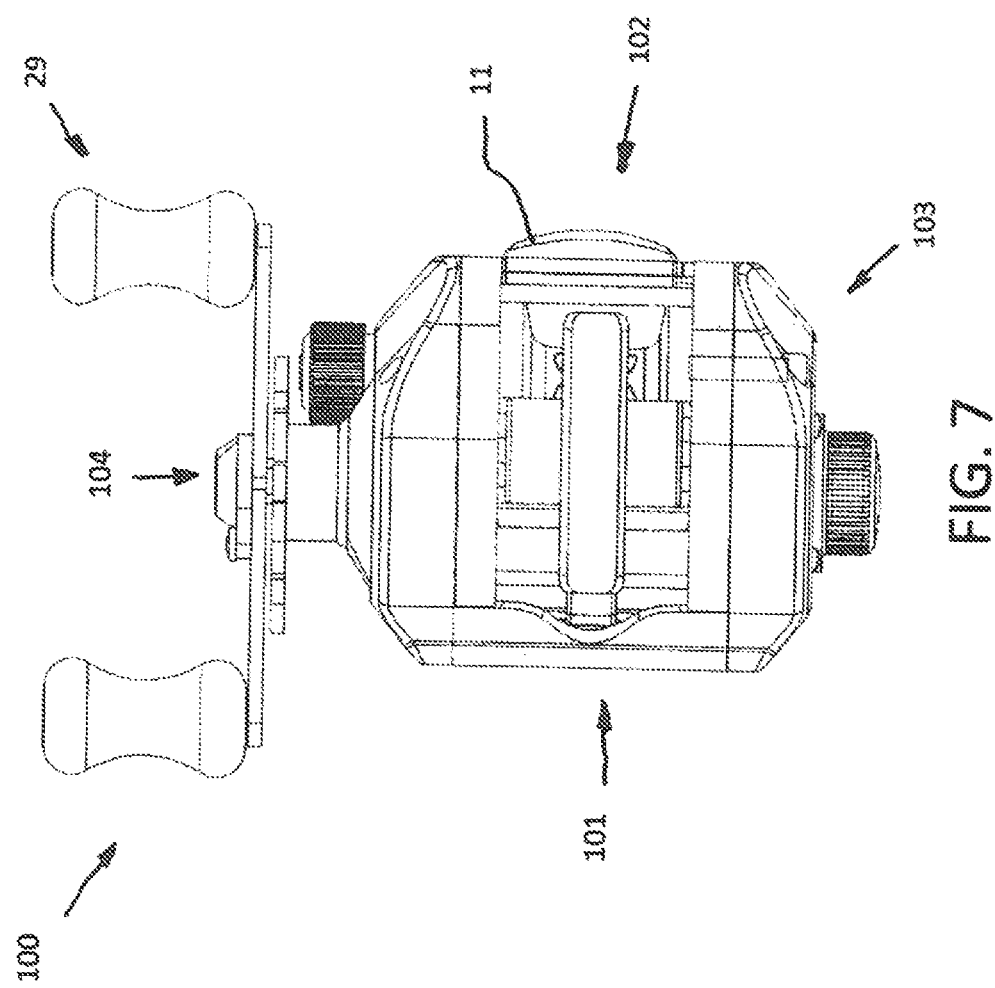
FIG. 7 is a bottom view of the device.
Figure 8:
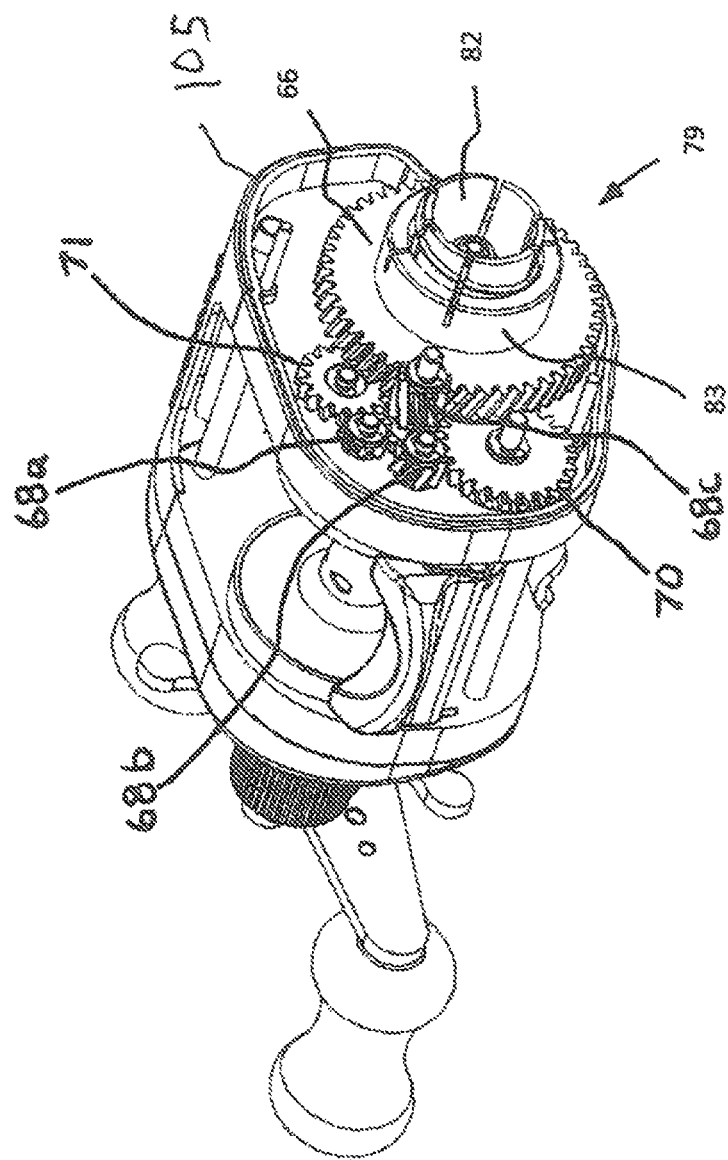
FIG. 8 is a perspective view of the device with internal components exposed.

FIGS. 1-7, show, from the exterior thereof, an embodiment of the fishing reel 100 of the present invention. The reel 100 has a front end 101 which faces outwardly from the user towards the casting direction, a rear or back end 102 which faces the user, a right (from the perspective of the user) or gear side 103 and a left or handle side 104. The reel 100 includes a housing 105 (See FIGS. 7-10) surrounding a spool 8. A crank handle 29 is disposed on the left side 104. A thumb release 11 is disposed toward the back end 102.

Although the handle assembly 104 is shown and described as being on the left side in this embodiment (left hand version), it is within the purview of the invention that the features of the invention could be constructed and arranged in an opposing or mirror image fashion, whereby, for example, the handle assembly 104 would be on the right side (right hand version—not shown).

The fishing reel 100 has a gear assembly disposed on the side of the reel opposite the crank handle which has a knob-style gear ratio selector 84 to easily and quickly change gear ratios to thereby change retrieval speeds. A selector plate 85 displays 3 gear ratios. An engaging collar assembly 79 contains a cog engager 80 with four teeth for engaging selected gears. A snap ring 81 is disposed one end of the cog engager 80, said end being connected to a drive collar 82. The drive collar 82 is threaded ¼ turn on its exterior, and gear ratio selector 84 is connected to the drive collar 82 via complementary threading on its interior.

The reel 100 has a gear assembly 110 disposed on the side 103 opposite the crank handle 29 which is assessable to the user to change the retrieval speed by manipulating the gear ratio selector 84, without having to open the housing 105 or remove the crank handle assembly 104.

FIGS. 8-11, 16 and 17, show internal features of the reel 100. The gear assembly 110 comprises idler gears 70 and 71, tandem drive gears 68 *a, b* and *c*, and large gears 65A, 65B and 66. Drive gears 68 are connected to the spool 8. The drive gears 68 are also indirectly connected to the crank 29 via the set of large gears 65A, 65B, and 66 which are disposed on the outer crank shaft 75, in tandem with respect to each other. Gears 65A, 65B, and 66 are disposed on the shaft 75, and provide gear ratios of 4.8:1, 5.2:1, and 6.2:1, respectively.

It is within the purview of the invention that further interchangeable single or cluster gears can be added or used with the reel 100 to yield further high or low gear ratios.

Figure 9:
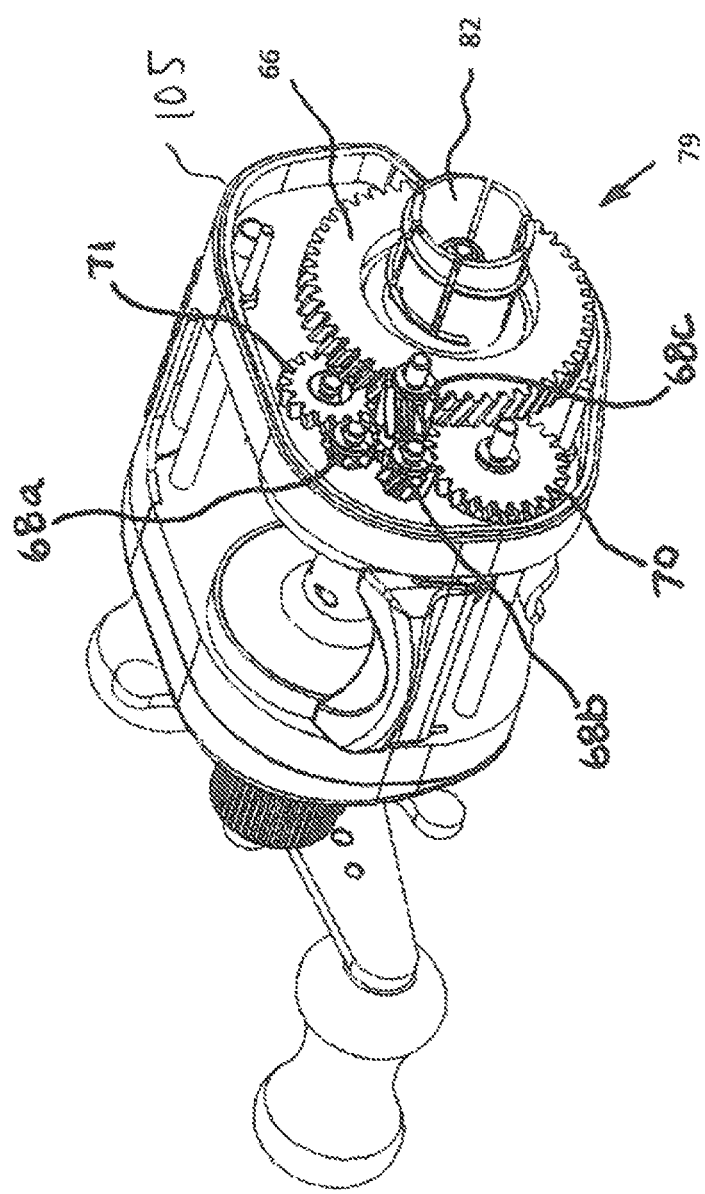
FIG. 9 is a perspective view of the device of FIG. 8 with a spacer collar 83 removed.
Figure 10:
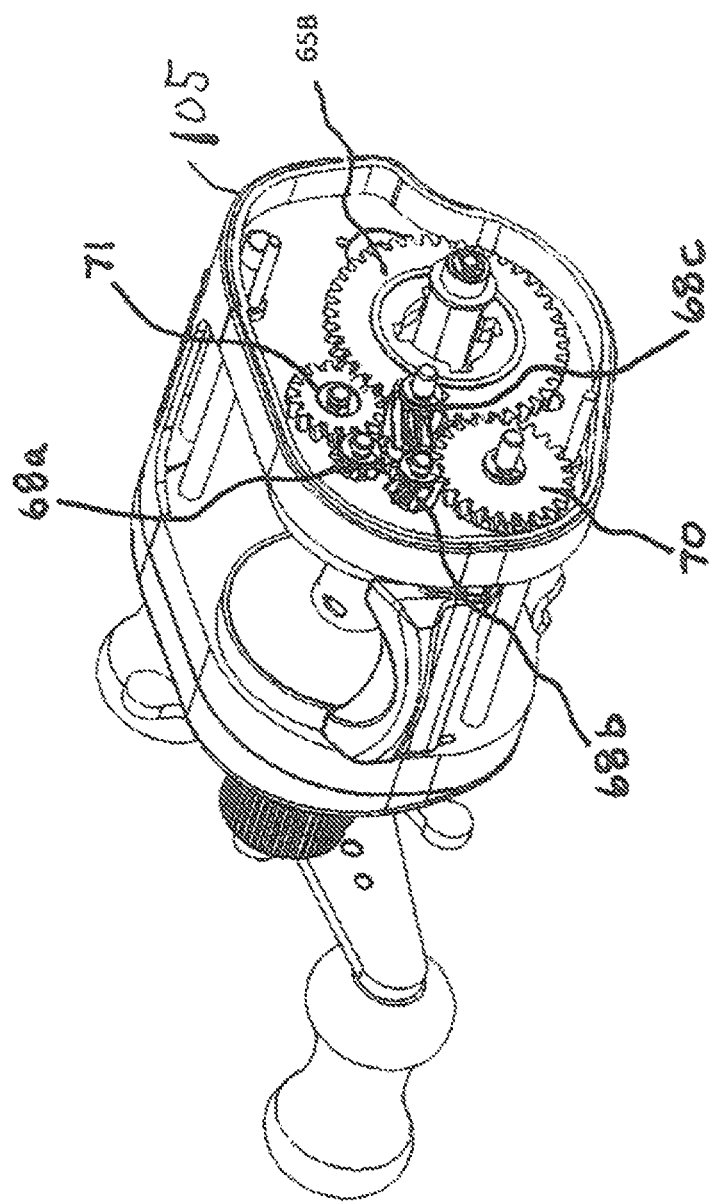
FIG. 10 is a perspective view of the device of FIG. 9 with a drive collar and an outermost large gear removed.
Figure 11:
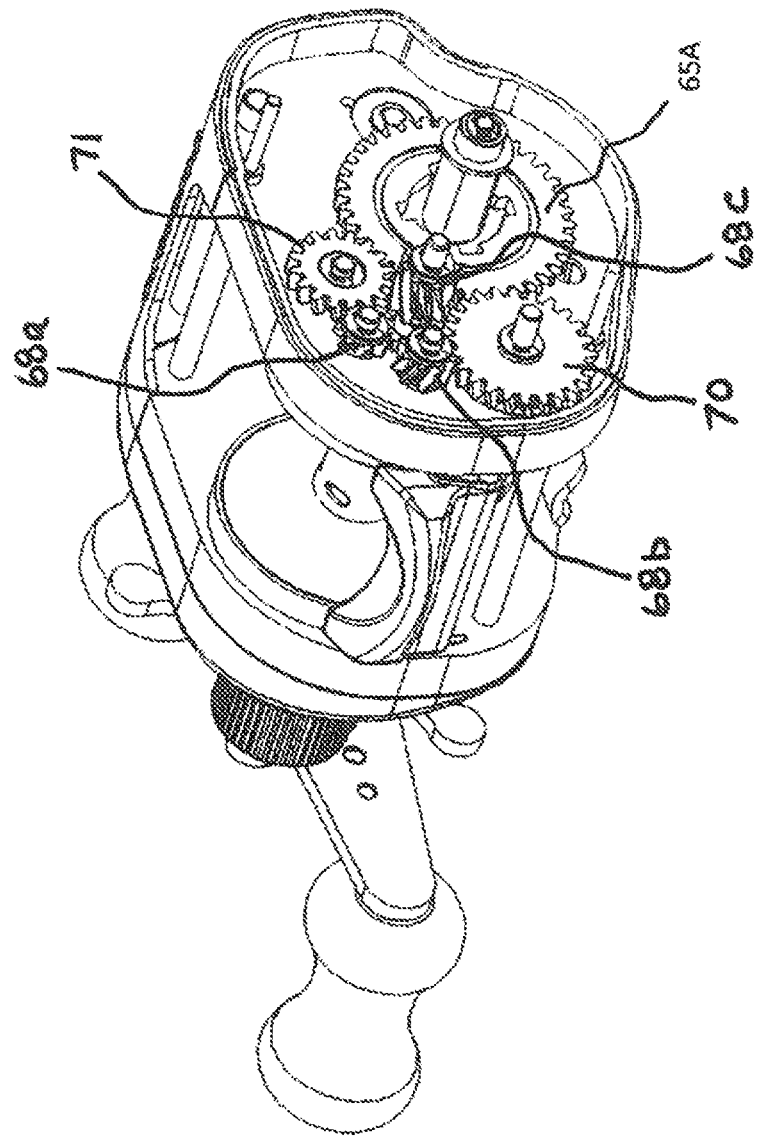
FIG. 11 is a perspective view of the device of FIG. 10 with a second outermost large gear removed.
Figure 12:
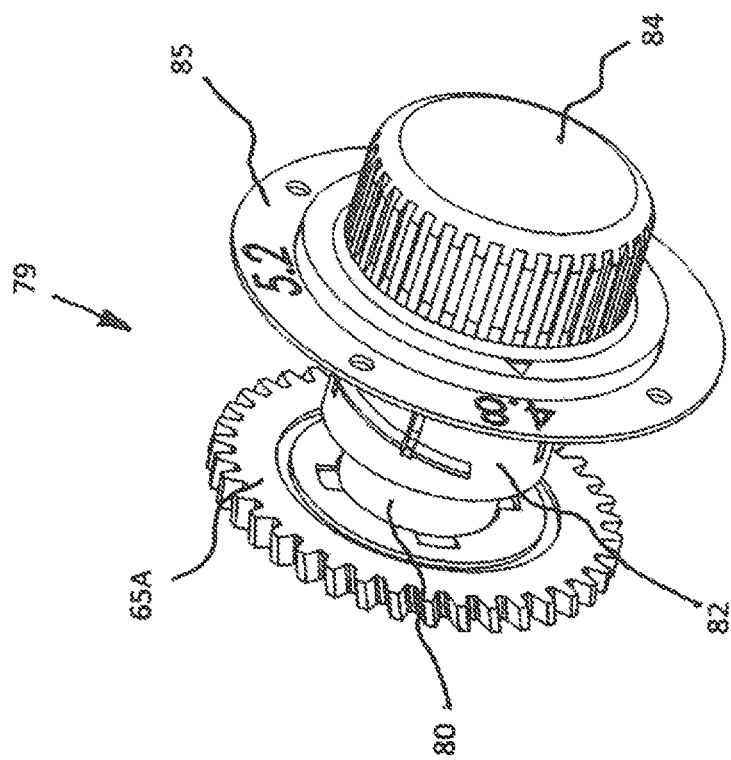
FIG. 12 is a perspective view of an embodiment of a cog engager of the device engaging a third outermost large gear.
Figure 13:
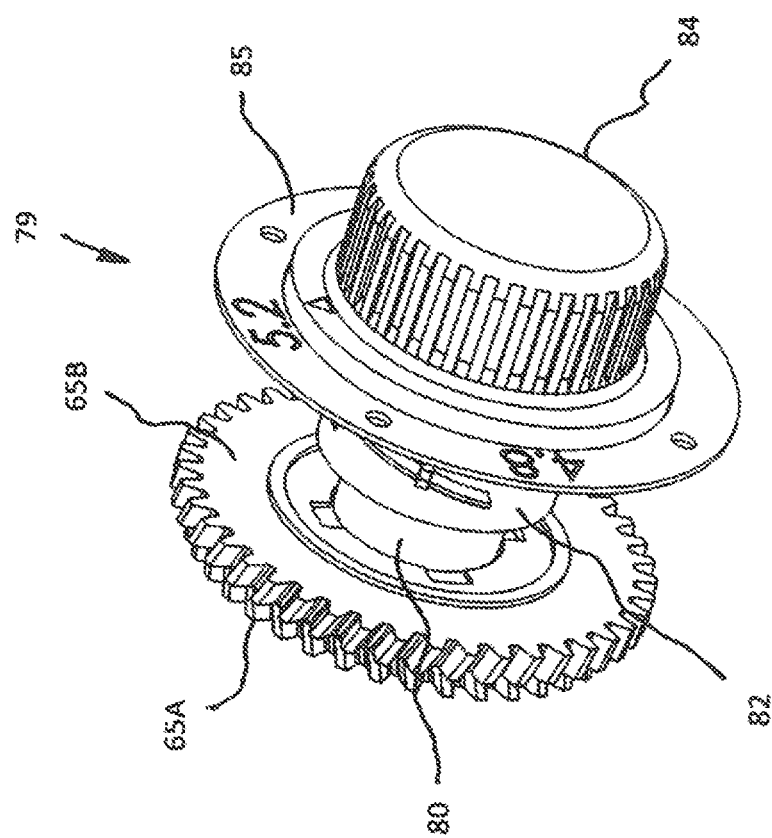
FIG. 13 is a perspective view of the cog engager engaging the second outermost large gear.
Figure 14:
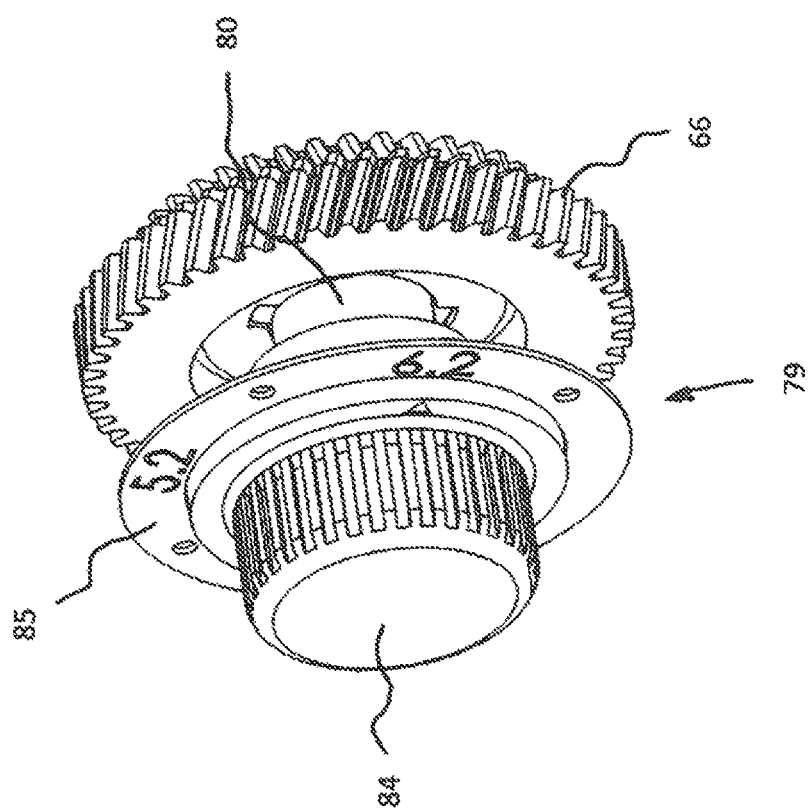
FIG. 14 is a perspective view of the cog engager engaging the outermost gear.
Figure 15:
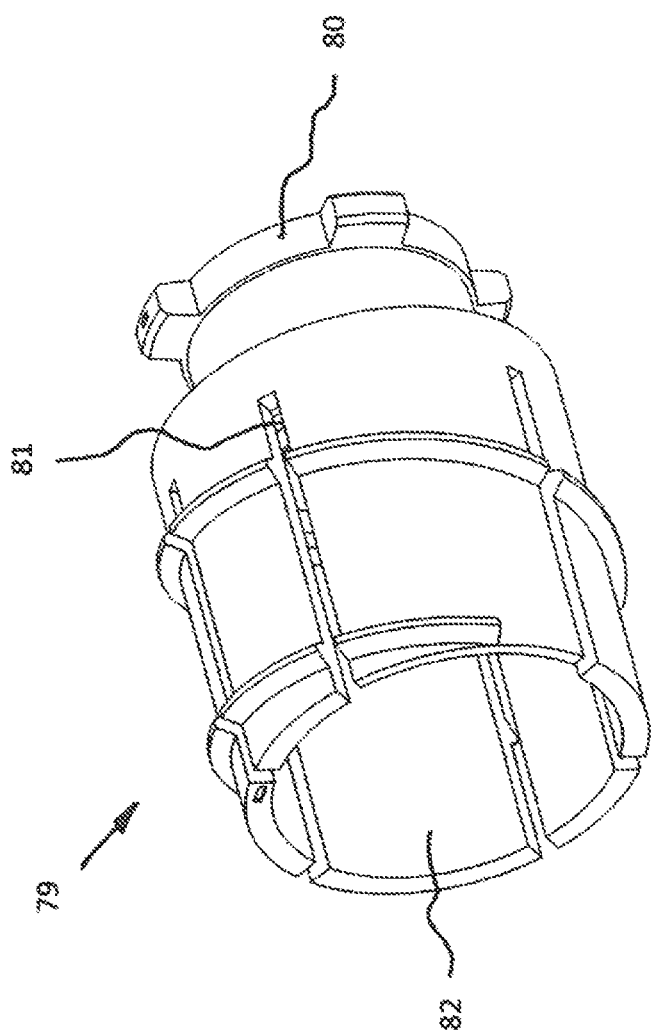
FIG. 15 is a perspective view of an embodiment of an engaging collar assembly.
Figure 16:
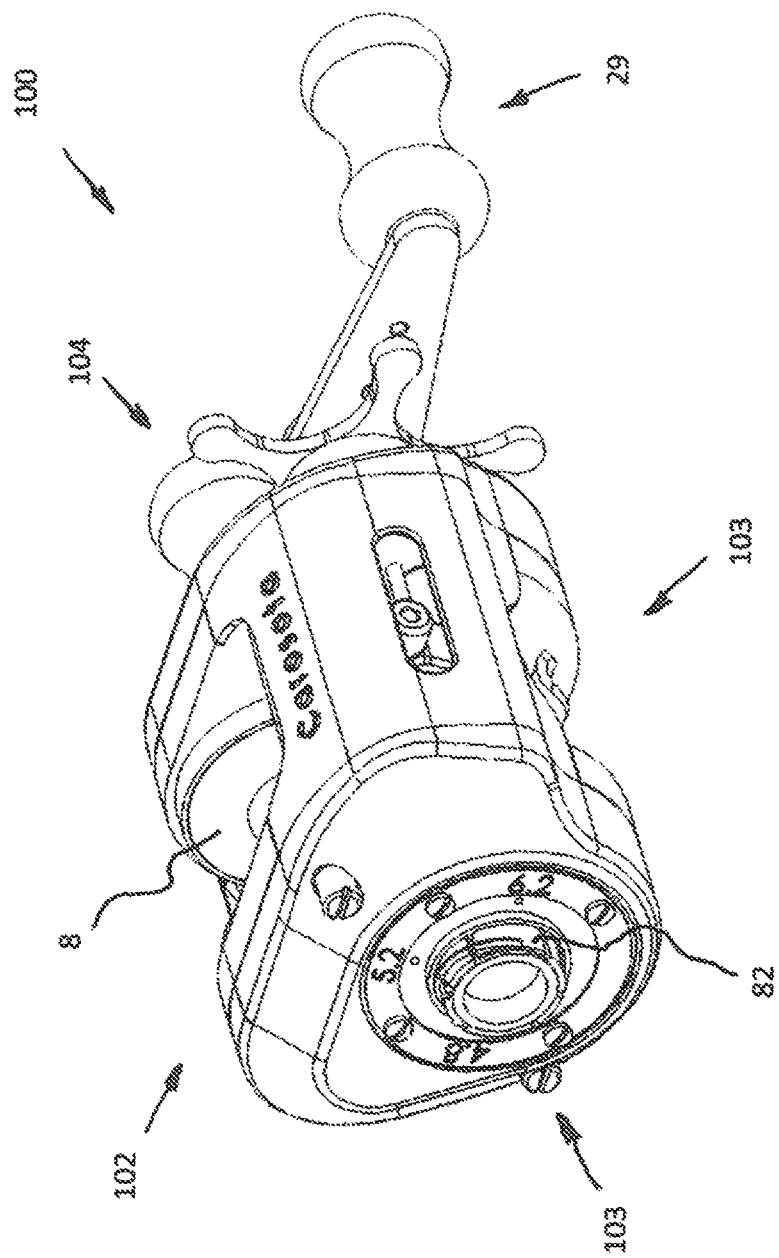
FIG. 16 is a perspective view of the device with a gear ratio selector knob of the cog engager removed.
Figure 17:
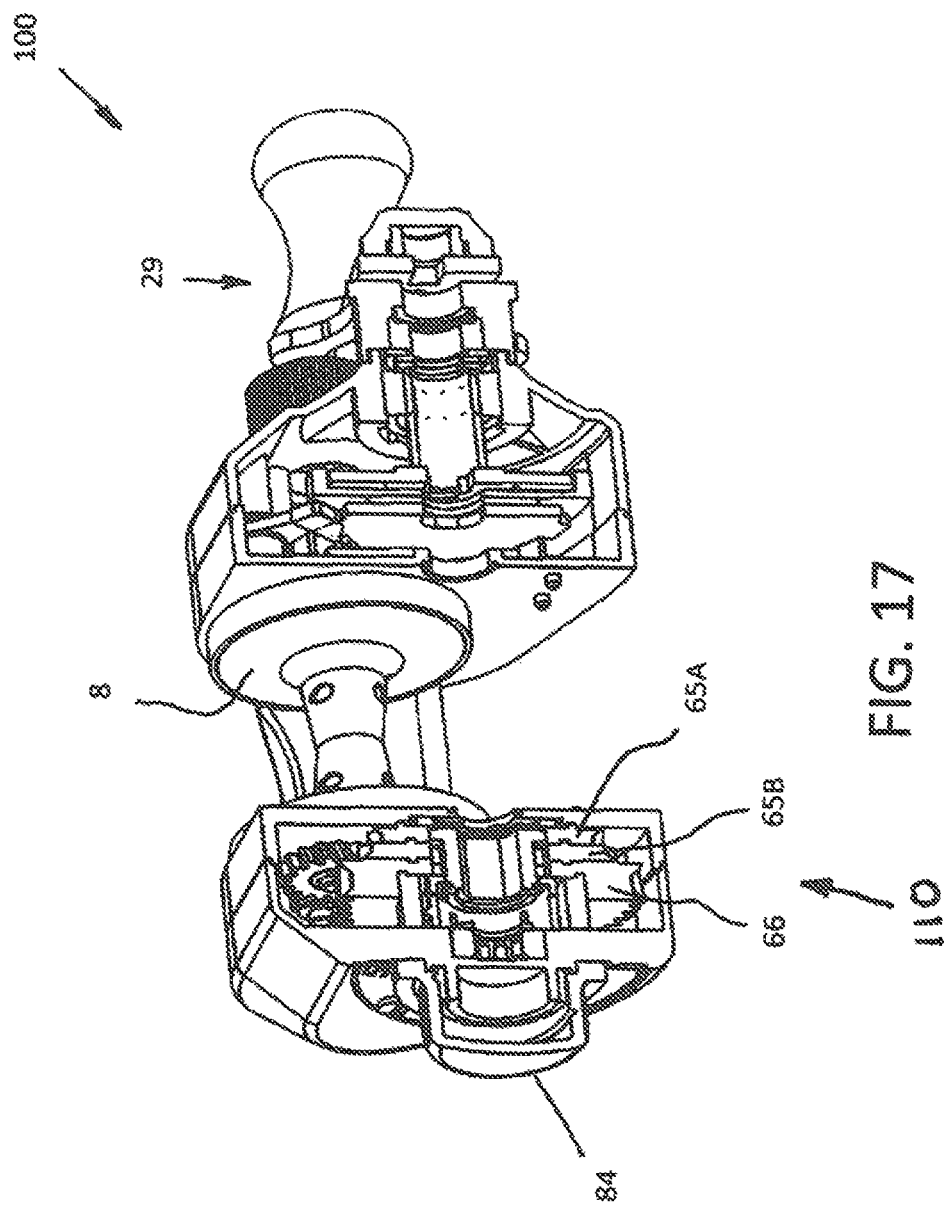
FIG. 17 is a cross-sectional perspective view of the device.
Figure 18:
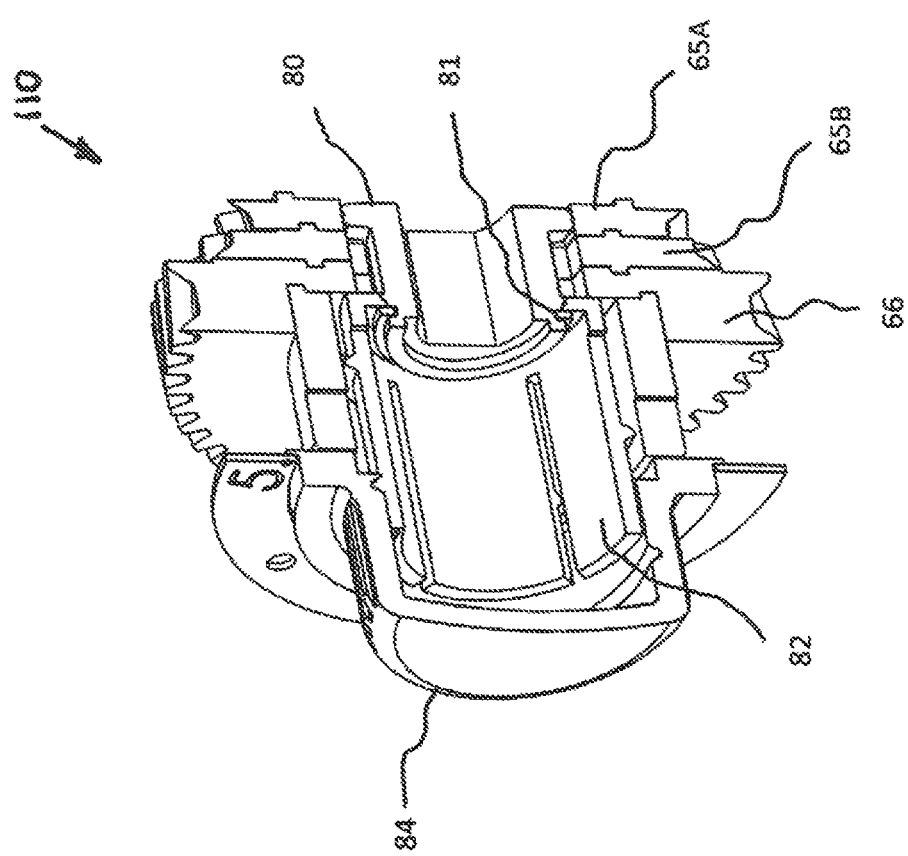
FIG. 18 is a cross-sectional perspective view of the cog engager and gear assembly.
Figure 19:
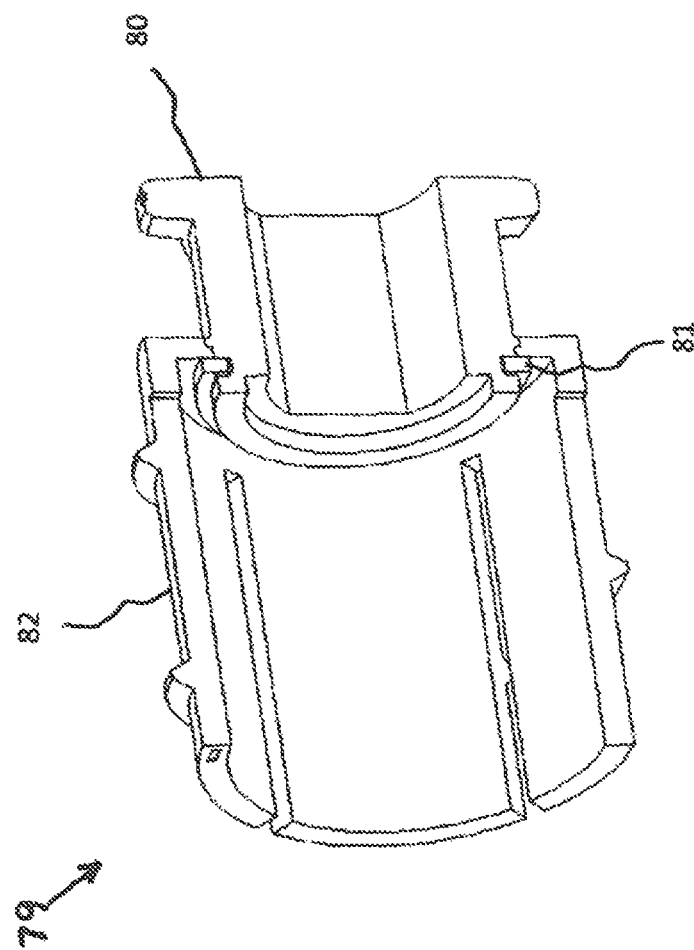
FIG. 19 is a cross-sectional perspective view of the engaging collar assembly.
Figure 20:
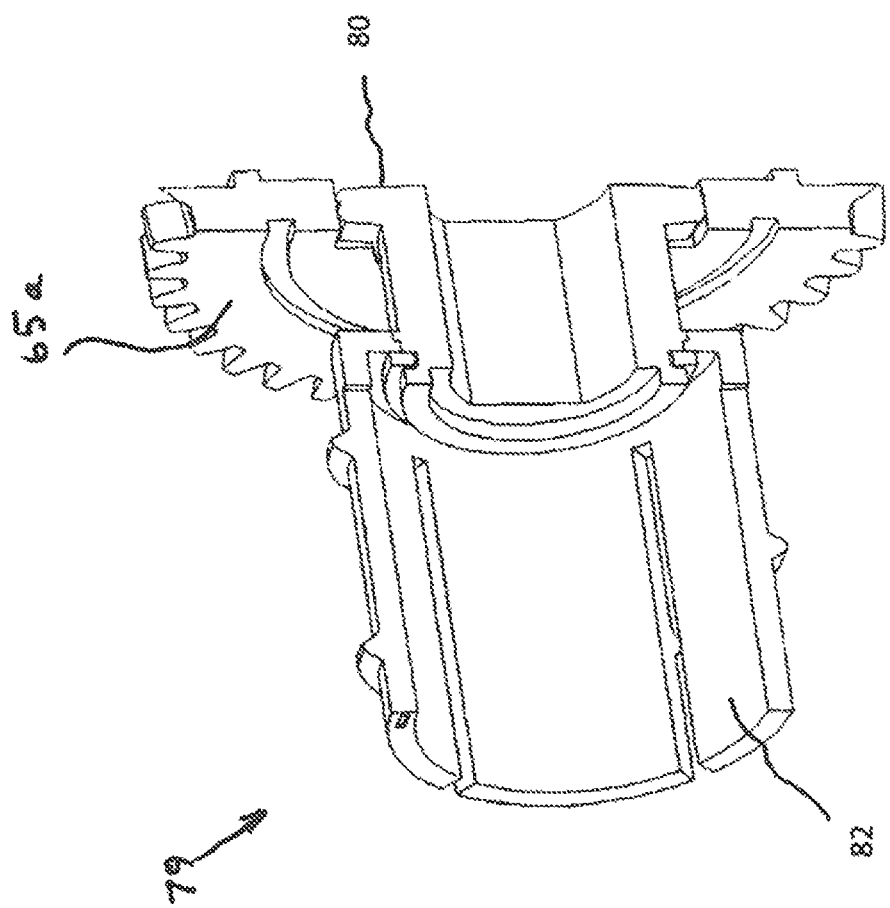
FIG. 20 is a cross-sectional perspective view of the engaging collar assembly engaging the third outermost gear.
Figure 21:
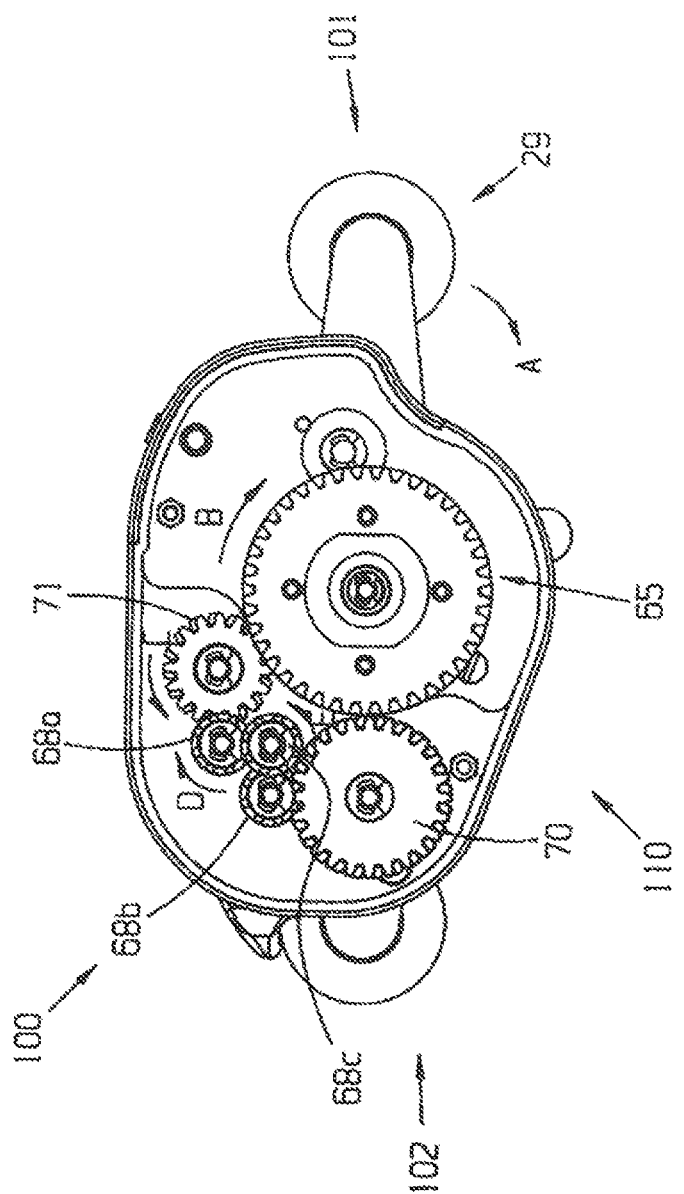
FIG. 21 is an end view of the reel with internal components exposed.
Figure 22:
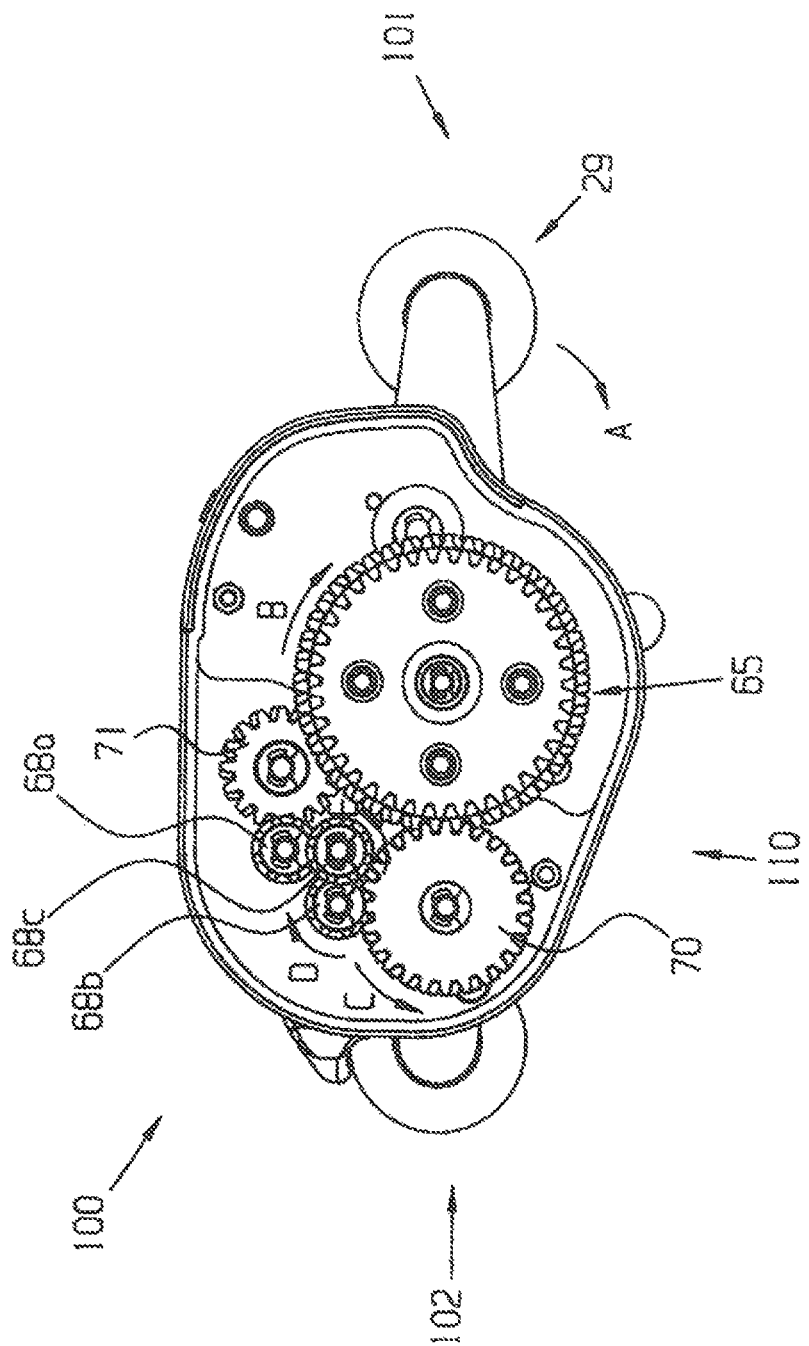
FIG. 22 is another end view of the reel with internal components exposed.
Figure 23:
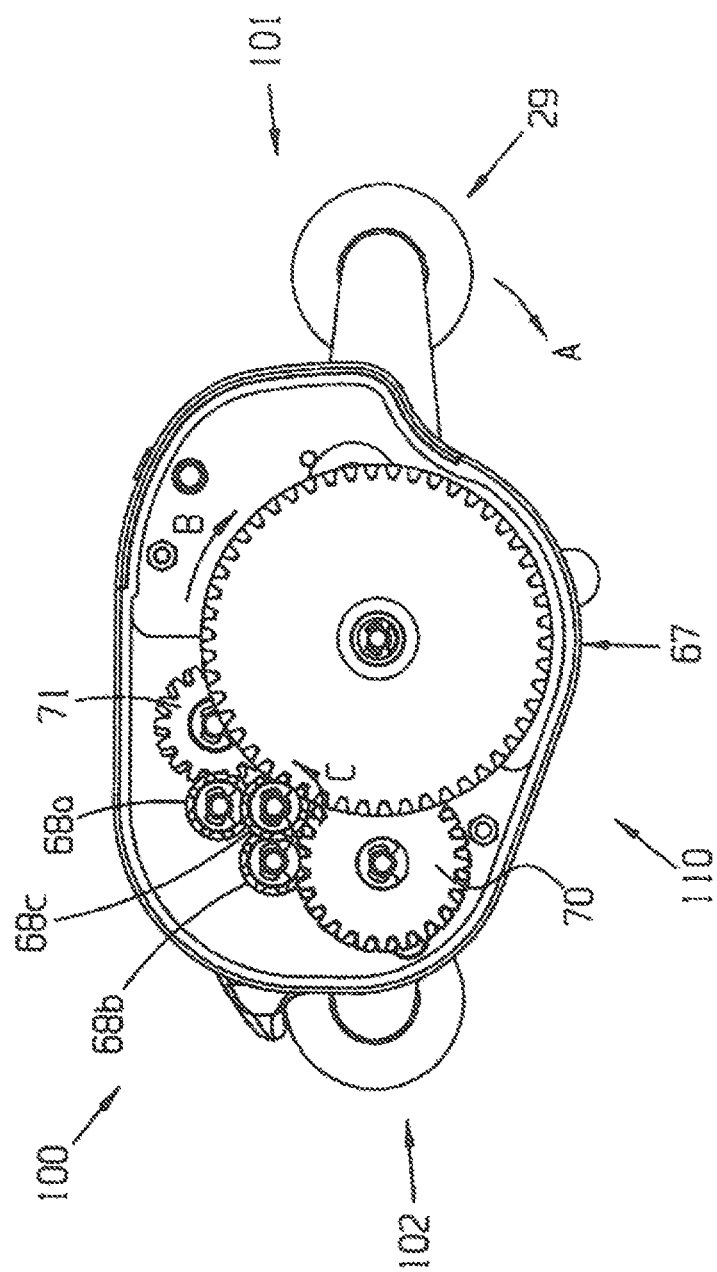
FIG. 23 is a further end view of the reel with internal components exposed.

In the preferred embodiment, the interconnection of gears in the gear assembly 110 for the low gear ratio (4.8:1) for slow retrieval speed is as follows: crank 29 is rotated clockwise, which rotates gear third outermost 65A clockwise, which moves idler gear 71 counterclockwise, which moves gear 68*a* clockwise, which moves gear 68*c* counterclockwise. Gear 68*c* is connected to the spool 8. The interconnection of gears in the gear assembly 110 for the intermediate gear ratio (5.2:1) for medium retrieval speed is as follows: crank 29 is rotated in clockwise, which rotates second outermost gear 65B clockwise, which moves idler gear 70 counterclockwise, which moves gear 68*b* clockwise, which moves gear 68*c* counterclockwise. The interconnection of gears in the gear assembly 110 for the high gear ratio (6.2:1) for fast retrieval speed is as follows: crank 29 is rotated clockwise, which rotates outermost gear 66 clockwise, which moves gear 68*c* counterclockwise. FIG. 9 shows the gear assembly with the spacer collar 83 removed. FIG. 10 shows the gear assembly with a drive collar 82 and the outermost large gear 66 removed. FIG. 11 shows the assembly with the second outermost large gear 65*b* removed. FIG. 12 shows the cog engager 80 engaging the third outermost large gear 65*a*.

The shaft assembly going through the spool 8 functions as a slip shaft. The slip shaft allows the gearing to disengage and to permit "free spooling" action whereby the spool spins without any drag from the gears meshing. Anti-backlash functionality and drag (for fish fighting) functionality work independently in the reel 100.

FIGS. 12-15, and 18-23 show details of various parts, assemblies and features of the reel 100.

The benefits of the invention include being able to use a single reel to retrieve a fishing lure at different speeds, and being able to make speed changes easily, and without removing the crank 29.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A reel comprising, a spool, a handle disposed on one side of the spool, and a gear assembly disposed on the opposite side of the spool, the gear assembly being communicatively connected to the handle and to the spool, the gear assembly having three tandem gears communicatively connected to a plurality of idler gears and to a plurality of drive gears, and a selector for changing the ratio of the gears, wherein the tandem gears include: an inner gear, an outer gear, and an outermost gear.

2. The reel of claim 1, further comprising a spool shaft assembly.

3. The reel of claim 2, wherein the spool shaft assembly comprises a spool shaft.

4. The reel of claim 1 further comprising a handle shaft assembly communicatively connecting the handle to the gear assembly.

5. The reel of claim 4 wherein the handle shaft assembly comprises an outer crank shaft coupled to the gear assembly and a handle shaft coupled to the handle.

6. The reel of claim 1 wherein the handle has at least one arm.

7. The reel of claim 1, wherein the gear assembly is adjustable to change reel retrieval speeds by changing the ratio of the gears without disconnecting the handle from the reel.

8. The reel of claim 7, further comprising a housing enclosing the gear assembly, and wherein the gear assembly is adjustable without removing the housing.

9. The reel of claim 1, wherein the gear assembly has a ratio which is adjustable between approximately 4.8:1 and 6.2:1.

10. The reel of claim 1, wherein the gear assembly further comprises an engaging collar assembly communicatively connected to the selector.

11. The reel of claim 10, wherein the engaging collar assembly comprises a cog engager having a plurality of teeth for engaging a selected gear.

12. The reel of claim 11, further comprising a drive collar interconnecting the cog engager and the selector.

\* \* \* \* \*